United States Patent
Chandler et al.

(10) Patent No.: US 12,039,473 B2
(45) Date of Patent: Jul. 16, 2024

(54) SOFTWARE DEVELOPMENT PROJECT INFRASTRUCTURE BUILDER TOOL

(71) Applicant: T-Mobile Innovations LLC, Overland Park, KS (US)

(72) Inventors: Christopher J. Chandler, Allen, TX (US); Venkata Reddy Donthireddy, Sammamish, WA (US); Tanmay Narendrabhai Parikh, Plano, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 317 days.

(21) Appl. No.: 17/516,691

(22) Filed: Nov. 1, 2021

(65) Prior Publication Data

US 2023/0132531 A1 May 4, 2023

(51) Int. Cl.
*G06Q 10/0631* (2023.01)
*G06F 8/61* (2018.01)
*G06F 8/70* (2018.01)

(52) U.S. Cl.
CPC ......... *G06Q 10/06313* (2013.01); *G06F 8/61* (2013.01); *G06F 8/70* (2013.01)

(58) Field of Classification Search
CPC ........ G06F 8/61; G06F 8/70; G06Q 10/06313
See application file for complete search history.

(56) References Cited

U.S. PATENT DOCUMENTS

| | | | | |
|---|---|---|---|---|
| 2006/0200792 A1* | 9/2006 | Hagstrom | ............... | G06Q 10/06 717/101 |
| 2008/0072217 A1* | 3/2008 | Li | ............... | G06F 8/71 717/170 |
| 2014/0173561 A1* | 6/2014 | Toub | ............... | G06F 8/73 717/123 |

(Continued)

OTHER PUBLICATIONS

Dinh-Tuan, Hai, et al. "Development frameworks for microservice-based applications: Evaluation and comparison." Proceedings of the 2020 European Symposium on Software Engineering. 2020. (Year: 2020).*

(Continued)

*Primary Examiner* — Kevin L Young
*Assistant Examiner* — Joanne G Macasiano (57) ABSTRACT

A method of building a software development project environment. The method comprises creating a software repository in a software repository and workflow tool system by a project microservice executing on a computer system, wherein the software repository comprises a workflow executable; transmitting an identification of the application development framework tool by the project microservice to a templates microservice; in response to receiving the identification of the application development framework tool, selecting by the template microservice executing on the computer system an application development tool based on the identification of the application development framework tool; requesting by the template microservice a code builder tool associated with the identified application development (Continued)

framework tool to build a software repository; returning software repository artifacts built by the code builder tool by the template microservice to the project microservice; and installing the software repository artifacts by the project microservice in the software repository.

20 Claims, 6 Drawing Sheets

(56) References Cited

U.S. PATENT DOCUMENTS

| | | | | |
|---|---|---|---|---|
| 2016/0098253 A1* | 4/2016 | Hutzel | ............... | G06F 8/20 717/109 |
| 2019/0102162 A1* | 4/2019 | Pitre | ............... | H04L 63/10 |

OTHER PUBLICATIONS

Zheng, Ling, and Bo Wei. "Application of microservice architecture in cloud environment project development." MATEC Web of Conferences. vol. 189. EDP Sciences, 2018. (Year: 2018).*

* cited by examiner

SOFTWARE DEVELOPMENT PROJECT INFRASTRUCTURE BUILDER TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software may be used to refer to a variety of instructions that can be executed by semiconductor processors. Software can include computer programs, computer code, computer scripts, firmware, and other expressions of machine executable logic. Almost all modern appliances have software executing in them: cell phones, personal computers, host computers, engine controllers in vehicles, airplane flight control systems, residential and commercial HVAC systems, communication systems, etc. Software in complex systems such as communication systems, air traffic control systems, inventory management systems can be extremely complicated. Automated tools and systems to assist in managing and controlling the configuration of software have been developed, but much of the activity of developing software remains a manual activity performed by software engineers, computer programmers, and coders. Often a team of software developers collaborate together in creating large, complex software systems.

SUMMARY

In an embodiment, a software development project infrastructure builder tool that builds a software development project infrastructure based on receiving declaratory statements from a user about the kind of infrastructure desired, streamlining the process of getting a software development project underway and prompting consistent compliance with software development process policies is disclosed. The tool comprises a processor, a non-transitory memory, a user interface stored in the non-transitory memory that, when executing by the processor, presents a list of available application development framework tools and receives input selecting one of the application development framework tools and a software development project name, a templates microservice stored in the non-transitory memory, and a project microservice stored in the non-transitory memory. When executed by the processor, the templates microservice receives a command to build a software repository that identifies characteristics about the software repository, selects a code builder tool based on the identified characteristics about the software repository, requests a software repository from the selected code builder tool, and returns the software artifacts. When executed by the processor, the project microservice receives information about the selected application development tool and the software development project name, creates an empty software repository based on the software development project name in a software repository and workflow tool system, requests a software repository from the templates microservice, receives software repository artifacts from the templates microservice, installs the software repository artifacts into the empty software repository in the software repository and workflow tool system.

In another embodiment, a method of building a software development project infrastructure based on receiving declaratory statements from a user about the kind of infrastructure desired, streamlining the process of getting a software development project underway and prompting consistent compliance with software development process policies is disclosed. The method comprises receiving by a project microservice executing on a computer system user input comprising identification of an application development framework tool, identification of a location to deploy a software development project environment, and a software development project name, in response to receiving the user input, creating a software repository in a software repository and workflow tool system by the project microservice, wherein the software repository comprises a workflow executable configurable to execute predefined software development process policies in response to software check-in events, and in response to receiving the user input, transmitting the identification of the application development framework tool by the project microservice to a templates microservice. The method further comprises, in response to receiving the identification of the application development framework tool, selecting by the template microservice executing on the computer system an application development tool based on the identification of the application development framework tool, requesting by the template microservice a code builder tool associated with the selected application development framework tool to build a software repository, and returning software repository artifacts built by the code builder tool by the template microservice to the project microservice, wherein the artifacts comprise code stubs that each comprises application programming interfaces (APIs), links to authentication libraries, and links to logging libraries. The method further comprises installing the software repository artifacts by the project microservice in the software repository and deploying the software development project infrastructure by the project microservice at the location identified by the user input.

In yet another embodiment, a method of building a software development project infrastructure based on receiving declaratory statements from a user. The method comprises receiving by a project microservice executing on a computer system user input comprising identification of an application development framework tool and a software development project name, in response to receiving the user input, creating a software repository in a software repository and workflow tool system by the project microservice, wherein the software repository comprises a workflow executable configurable to execute predefined software development process policies in response to software check-in events, and in response to receiving the user input, transmitting the identification of the application development framework tool by the project microservice to a templates microservice. The method further comprises, in response to receiving the identification of the application development framework tool, selecting by the template microservice executing on the computer system an application development tool based on the identification of the application development framework tool, requesting by the template microservice a code builder tool associated with the selected application development framework tool to build a software repository, returning software repository artifacts built by the code builder tool by the template microservice to the project microservice, installing the software repository artifacts by the project microservice in the software repository, and presenting a sandbox learning interface to the user inputting information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Starting a software development project in an enterprise can involve many tasks before a software developer ever begins to study the software requirements and designing a software architecture to implement the requirements. A development tool may be selected and stood up. A software repository may be established. A continuous integration/continuous delivery (CI/CD) pipeline may be linked into the software repository such that check-in of software triggers automated actions of the CI/CD pipeline to execute. A deployment infrastructure may be established. It may fall to the software developers to set these things up, but the software developers may not in fact have the skills and experience to set-up these kinds of working environments — their core competence may be in developing software. Additionally, even if the software developers can manage to complete the set-up, the set-up activity can be time consuming and delay the launch of the productive software development work. The software developers, further, may complete the set-up in a non-standard way that differs undesirably from development project to development project, when different software developers are responsible for launching the different development projects. In some cases, software developers may overlook establishing a geographical redundancy capability of the software development project, because on a previous project this was handled by the deployment team, but in this case the deployment team is not expecting to automatically set-up geographical redundancy. Consequently, the system may be deployed without geographical redundancy, and only when a localized natural disaster (forest fire, flood, tornado) takes the system out of service for an extended period of time does the need for georedundancy come into view. The software development project may be set up without building in protections for personally identifiable information (PII) from the start and in a systematic way. All of these present problems for software development projects.

The present disclosure teaches a software development project builder tool that is able to do most of these initial set-up tasks with minimal inputs from software developers and often avoid the problems described above that can occur in manual set-up of software development projects. This provides both time efficiencies for time spent getting the software development project set up and getting the software development project underway, and it also provides benefits of correctness and problem avoidance. The project builder tool prompts a user to select a software development tool from a list, prompts the user to provide a project name, prompts the user to identify a deployment environment, and the project builder tool does the rest. The project builder tool can build in protection of personal identifiable information (PII), for example when a requirement to prompt subscribers over the age of 55 with a particular solicitation is part of the project. The project builder tool can build in logging support. The project builder tool can build in support for geographical redundancy in the deployment environment. The project builder tool can build in support for nonfunctional requirements such as doing static code analysis, for example executing "lint"-like static analysis of code to flag programming errors, bugs, stylistic errors, and suspicious logical constructs.

The software development project builder tool provides an opportunity for avoiding responsibilities falling between the cracks because of imprecise communication among team members. The software project builder tool provides an opportunity for promulgating a uniform enterprise-wide software development process. This uniform software development process can promote reliability of the deployed software development project in several ways (e.g., consistent and automated checks of software practices, mandatory performance of quality procedures). The software project builder tool also supports ease of adapting and improving software development processes, supporting fast pivots as lessons are learned and the enterprise learns from evolving industry practices, and does not require manual updating in each different software development project. The software project builder tool enforces rigor where lack of knowledge or lack of skill might have led to variant choices which are not as effective and/or miss key process steps.

The CI/CD pipeline is defined by the project builder tool using templates, such that as the templates change, the pipelines change. Thus, significant underlying details of the software development project can be seamlessly changed by modifying the templates, and the changes deploy transparently to the next software development project and to users. The templates can be used to define and enforce enterprise software architectural and software development standards and policy. In an embodiment, selections of a software development tool or a code generator and other options by the user are mapped by the software development builder tool to a particular set of pre-defined templates. The collection of templates making up such a set define pipeline actions that are performed when software development events relative to a project software repository occur, such as code check in, code build, code test, code deploy, or other software development events. These templates are defined outside of the project software repository, and when an event occurs that invokes a pipeline event, the functional behavior defined by the template is looked up or accessed dynamically at that time. Thus, if the template—the particular pipeline action—changes, the processing performed on this event is that defined by the changed template. This makes the software development builder tool very easily maintainable.

The software development project builder tool reaches out to a selected one of a plurality of third-party code generator tools, based on the software development tool selected by the user from the list, and prompts the selected code generator tool to build scaffolded code (e.g., code stubs with application programming interfaces (APIs) built in, logging built in, protections for PII built in). These third-party code generator tools exist outside the project builder tools—they are not integrated inside the project builder tool as plug-ins—and this makes the project builder tool more flexible and adaptable. For example, if it is desired for the project builder tool to interact with an additional third-party code generator tool, the user interface drop down list need only be modified to include the additional third-party code generator in the list and map this list entry to the URL/URI or other address of the third-party code generator tool. Other automated code building frameworks may typically be built into the software tool, which can make such software tools difficult to maintain and difficult to extend to work with newly deployed third-party code generator tools, because the new code generator would need to be integrated into the software tool in the form of a plug-in. The software project development builder tool taught herein avoids this problem by not integrating these third-party tools.

In some contexts, the software development project builder tool may be referred to as a starter kits tool. The starter kits tool avoids developers reinventing the wheel. The starter kits tool assures consistency of set-ups across different software development projects. The starter kits tool allows the enterprise to leverage the value of subject matter experts (SMEs) beyond the confines of their specific projects by institutionalizing their knowledge in the starter kits. In an example implementation, the starter kits tool has been found to save 2 weeks to 4 weeks getting a new software development project launched. In a number of software development projects using the starter kits tool to launch, this has led to total savings accumulated across the several projects of anywhere from about 30,000 hours to about 60,000 hours of software development time and a cost savings of between about $4 M and about $8 M Turning now to FIG. 1, a system 100 is described. In an embodiment, system 100 comprises one or more work stations 102, a network 104, a user interface (UI) application 106 including a list of application development frameworks 108, a project microservice 110, and a templates microservice 112. The work stations 102 may be implemented as computers, for example desktop computers or laptop computers. The network 104 may comprise one or more private networks, one or more public networks, or a combination thereof. The UI application 106, the project microservice 110, and the templates microservice 112 may be applications that execute on one or more computer systems. Computer systems are discussed further hereinafter. In an embodiment, the UI application 106, the project microservice 110, and the templates microservice 112 are part of a software development project builder tool 115.

Figure 1:
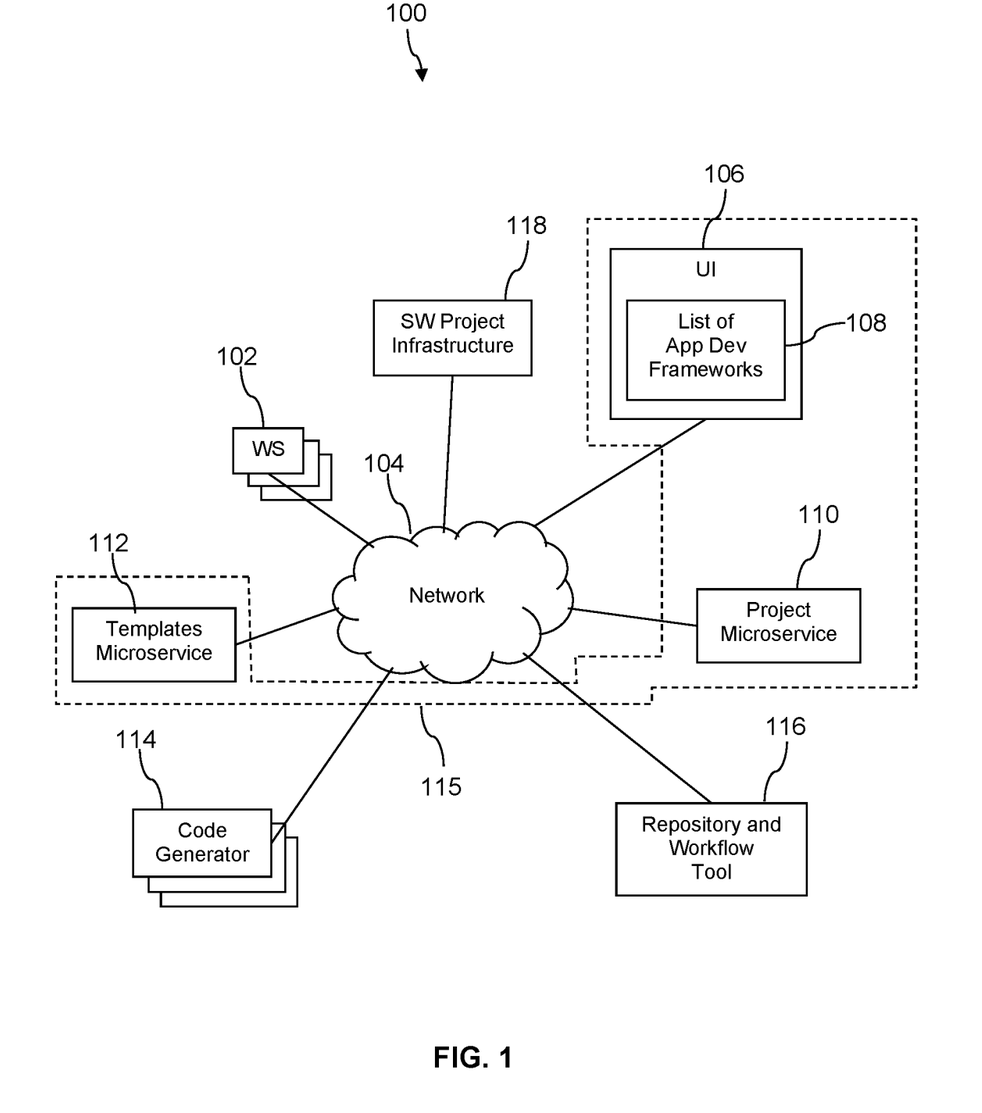
FIG. 1 is a block diagram of a system according to an embodiment of the disclosure.

The work stations 102, the UI application 106, the project microservice 110, and the templates microservice 112 are all communicatively coupled to the network 104 and are able to intercommunicate via the network 104. In an embodiment, the work stations 102 may only communicate with the UI application 106 and may not communicate directly with the project microservice 110 and the templates microservice 112. The work stations 102 may indirectly communicate via the UI application 106 with the project microservice 110 and the templates microservice 112. In an embodiment, the work stations 102 may communicate directly with the project microservice 110, for example to call an application programming interface (API) of the project microservice 110 to call an automated bulk generation of a plurality of software projects at one time. The project builder tool 115 may communicate via the network 104 with one or more code generator applications 114 that are provided by third-parties. The project builder tool 115 communicates via the network 104 with a software repository and workflow tool 116.

In an embodiment, a user may use the workstation 102 to log into the software development project builder tool 115, for example to log into a web page interface extended by the UI application 106. The user may select an application development framework from the list of application development frameworks 108 presented by the UI application 106 on a display of the work station 102. In some contexts, the selection of an application development framework may be referred to as selecting a starter kit. The user may input a name of a software development project or an enterprise project name. The user may select a deployment architecture specifying where the software to be developed ultimately will be deployed. For example, the user may select deployment to an on premise location, to cloud Kubernetes, to a Pivotal Cloud Foundry (PCF), or another deployment location. The user may select a type of deployment, for example identifying a geographic redundant deployment, such that if one data center fails (local power outage, massive fiber cut, natural disaster) the software may be executed at a different geographically located data center.

The list of application development frameworks 108 includes a plurality of different application development frameworks, for example a Spring Boot application development framework, an Angular application development framework, a React application development framework, and other application development frameworks. As new application development frameworks are deployed by third parties, the list of application development frameworks 108 can be extended to include new application development frameworks, if so desired. The user interface 106 maps the identity of the application development frameworks presented to users by the work stations 102 (e.g., in a drop-down list in a graphical user interface (GUI) presented on a display of the work stations 102) to a reference or address associated with each of the different application development frameworks, for example a uniform resource locator (URL), a uniform resource identifier (URI), or an Internet Protocol (IP) address. The references link to the code generators 114 corresponding to the application development frameworks.

When the user submits or commits these selections and inputs, the UI application 106 conveys this information to the project microservice 110. The project microservice 110 validates the request to create a software development project (e.g., to build a starter kit). For example, the project microservice 110 may check to make sure no previously build software development project has already used the name input to the UI application 106 by the workstation 102. If the request is valid, the project microservice 110 reaches out to the repository and workflow tool 116 to establish an empty software and/or project artifacts repository.

The project microservice 110 sends a request to the templates microservice 112, identifying the selected application development framework (e.g., providing the URL, URI, IP address, or other reference identifying a specific code generator 114). The templates microservice 112 uses the reference to reach out to the appropriate one of the code generators 114 to request scaffolded code suitable to the software development project. The code generator 114 builds the scaffolded code and returns it to the templates microservice 112. In an embodiment, the templates microservice 112 may provide some content for the scaffolded code itself, for example by adding logging code support, adding authentication code support. The templates microservice 112 can build in CI/CD pipeline logic such that when code is checked in by developers in the repository and workflow tool 116, the CI/CD pipeline executes in the repository and workflow tool 116. For example, the templates microservice 112 can build execution of lint-like scripts into the CI/CD pipeline logic that checks compliance of the checked in code or software with software development standards. For example, the templates microservice 112 can build compilation of checked in code and execution of some tests to assure code is properly set-up. The templates microservice 112 sends the generated code artifacts and pipeline artifacts to the project microservice 110.

The project microservice 110 pushes the generated code artifacts and pipeline artifacts into the previously established empty repository within the repository and workflow tool 116. The repository and workflow tool 116 executes (e.g., the pipeline portion executes) and pushes generated code (produced by the selected code generator 114 and supplemented by the templates microservice 112) to a software project infrastructure 118. The software project infrastructure 118 may be an on-premise, a cloud Kubernetes, a PCF, or another type of deployment infrastructure. The UI application 106 at the completion of this process sends a link to the user at the workstation 102. The user now has access to work and develop software in the software project infrastructure 118 with a great many of the set-up details already completed for him or her. In an embodiment, the repository and workflow tool 116 is a GitLab tool. The repository and workflow tool 116 reports back to the project microservice 110, and the project microservice 110 stores details of project deployment.

The software development project builder tool 115 saves the software developers much time getting the project up and running. It avoids the software developers "reinventing the wheel," as it were, every time a new software development project is launched. It promotes consistency from project to project within an enterprise. It lets software developers rely on their core competency rather than having to become experts in environment set-up and initial tool configuration. Additionally, the project builder tool 115 can leverage the expertise of various people within an enterprise by building their insights and knowledge into the project builder tool 115 (for example into the templates microservice 112). The project builder tool 115 can act as a framework for promulgating software standards and processes across the enterprise. As changes are made in the software development project builder tool 115, these changes are automatically built into later launching software development projects.

Figure 2A:
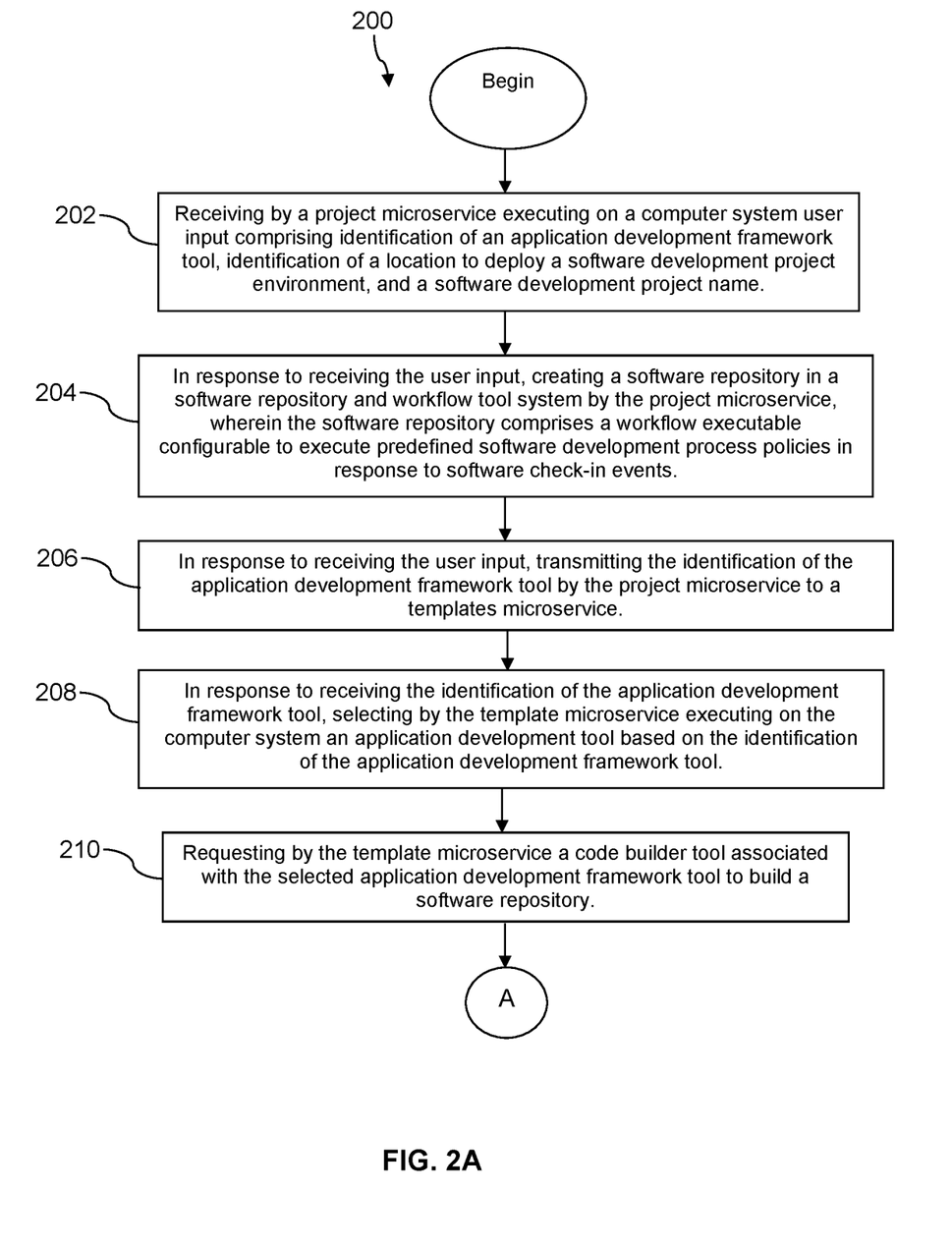
FIG. 2A and FIG. 2B are a flowchart of a method according to an embodiment of the disclosure.
Figure 2B:
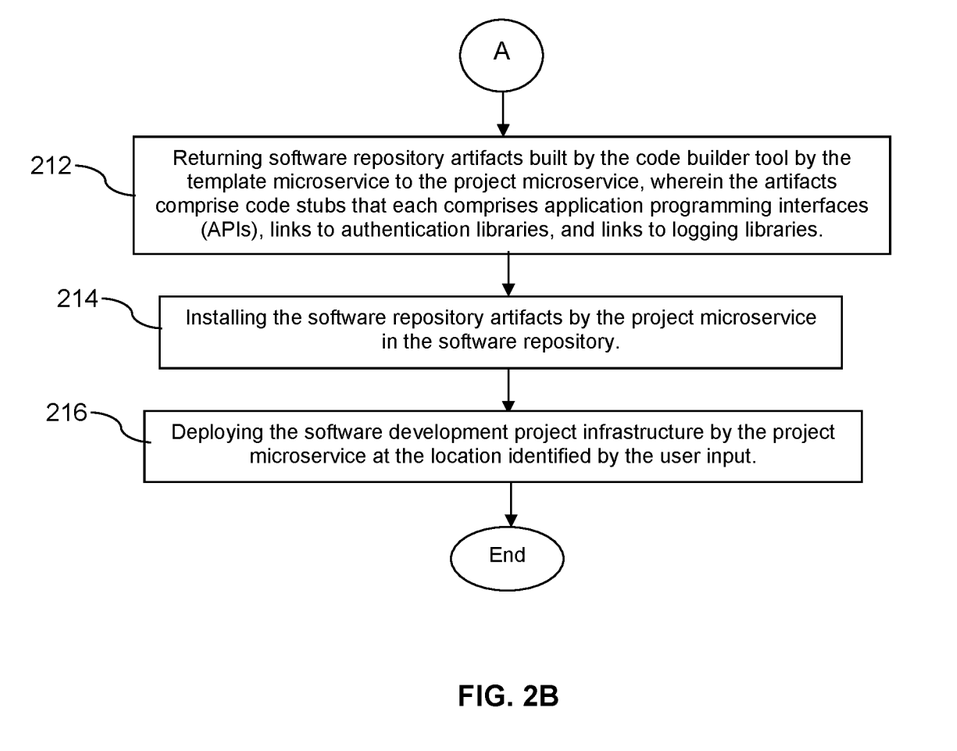

Turning now to FIG. 2A and FIG. 2B, a method 200 is described. In an embodiment, the method 200 is a method of building a software development project infrastructure based on receiving declaratory statements from a user about the kind of environment desired, streamlining the process of getting a software development project underway and prompting consistent compliance with software development process policies. In some contexts, the software development project infrastructure may comprise a software development project environment: a set of computing resources and software development tools used to design, develop, test, and release software. At block 202, the method 200 comprises receiving by a project microservice executing on a computer system user input comprising identification of an application development framework tool, identification of a location to deploy a software development project environment, and a software development project name. In an embodiment, the identification of the application development framework tool comprises a uniform resource locator (URL), a uniform resource identifier, or an Internet Protocol (IP) address that references the code builder tool associated with the selected application development framework tool.

At block 204, the method 200 comprises, in response to receiving the user input, creating a software repository in a software repository and workflow tool system by the project microservice, wherein the software repository comprises a workflow executable configurable to execute predefined software development process policies in response to software check-in events. At block 206, the method 200 comprises, in response to receiving the user input, transmitting the identification of the application development framework tool by the project microservice to a templates microservice.

At block 208, the method 200 comprises, in response to receiving the identification of the application development framework tool, selecting by the template microservice executing on the computer system an application development tool based on the identification of the application development framework tool. At block 210, the method 200 comprises requesting by the template microservice a code builder tool associated with the selected application development framework tool to build a software repository. In an embodiment, the code builder tool associated with the selected application development framework tool is located outside the template microservice and outside the project microservice.

At block 212, the method 200 comprises returning software repository artifacts built by the code builder tool by the template microservice to the project microservice, wherein the artifacts comprise code stubs that each comprises application programming interfaces (APIs), links to authentication libraries, and links to logging libraries. In an embodiment, the software repository artifacts comprise a plurality of code scaffolding files generated by the code builder tool. In an embodiment, the code scaffolding comprises logging functionality. In an embodiment, the code scaffolding comprises APIs. In an embodiment, the template microservice provides software repository artifacts not produced by the code builder tool but generated by itself or stored by itself, for example in a library of artifacts. In an embodiment, the template microservice provides CI/CD pipeline artifacts, for example a script that screens software checked into the software repository for compliance with predefined coding standards.

At block 214, the method 200 comprises installing the software repository artifacts by the project microservice in the software repository. The processing of block 214 may further comprise executing a CI/CD pipeline implemented by the software repository based on being configured with the artifacts and generating a software development project infrastructure. Alternatively, executing the CI/CD pipeline implemented by the software repository based on being configured with the artifacts may trigger the execution of block 216. At block 216, the method 200 comprises deploying the software development project infrastructure by the project microservice at the location identified by the user input.

Figure 3A:
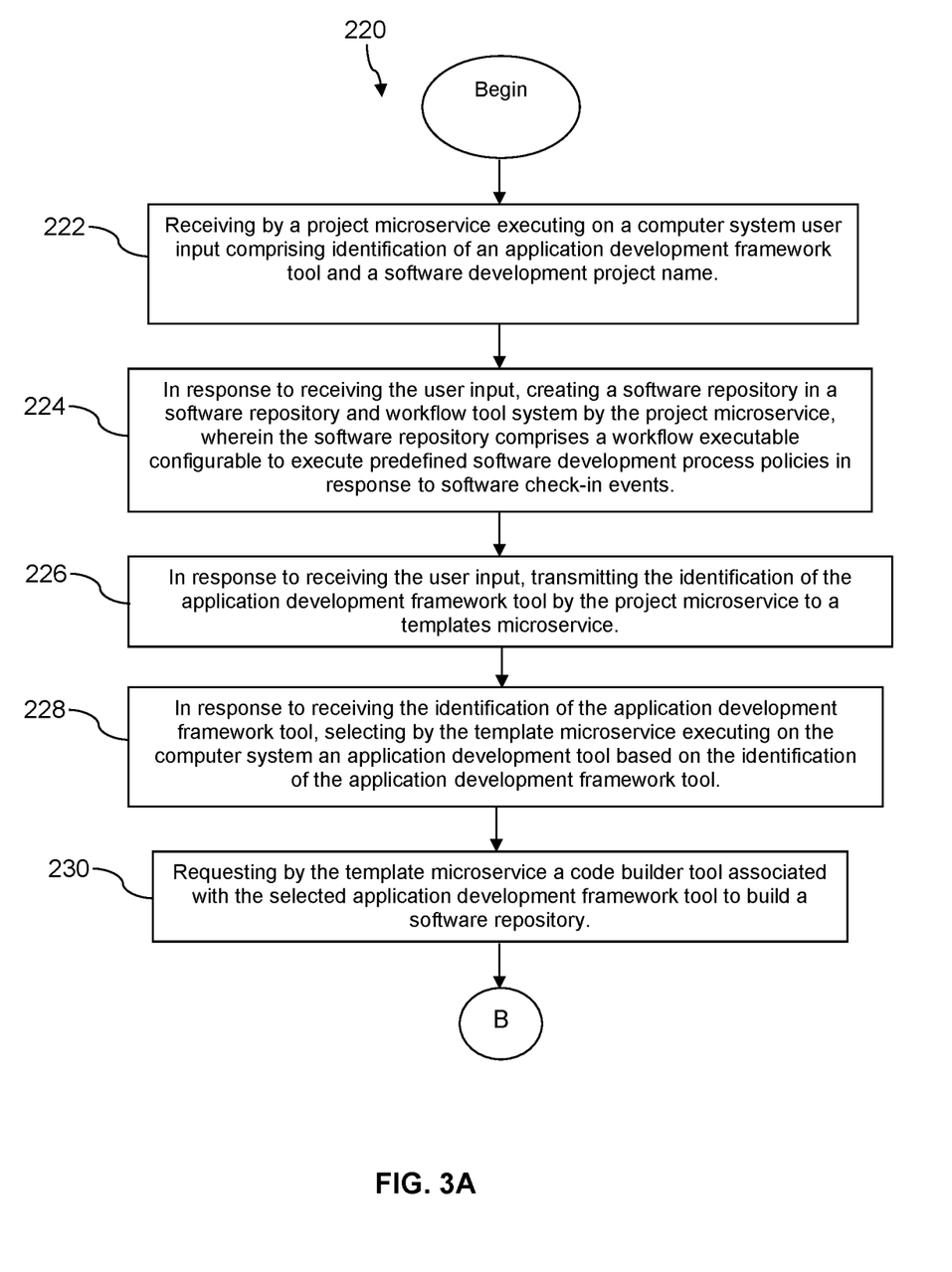
FIG. 3A and FIG. 3B are a flowchart of another method according to an embodiment of the disclosure.
Figure 3B:
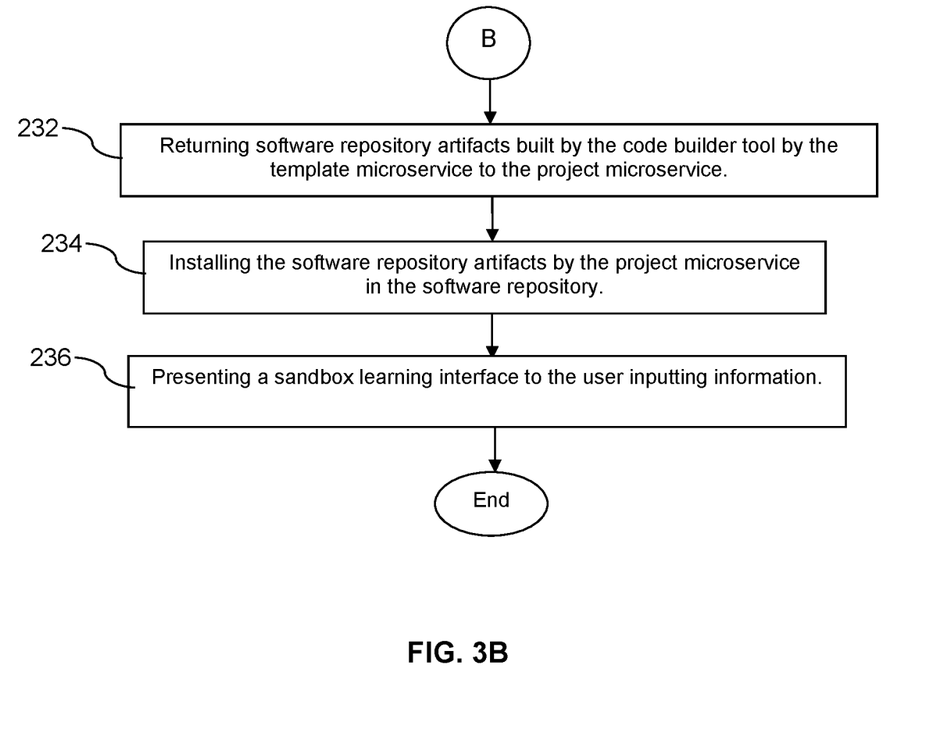

Turning now to FIG. 3A and FIG. 3B, a method 220 is described. In an embodiment, the method 220 is a method of building a software development project infrastructure based on receiving declaratory statements from a user. In some contexts, the software development project infrastructure may comprise a software development project environment: a set of computing resources and software development tools used to design, develop, test, and release software. At block 222, the method 220 comprises receiving by a project microservice executing on a computer system user input comprising identification of an application development framework tool and a software development project name. In an embodiment, the user input further defines whether a geographic redundancy configuration is needed for the software development project infrastructure.

At block 224, the method 220 comprises, in response to receiving the user input, creating a software repository in a software repository and workflow tool system by the project microservice, wherein the software repository comprises a workflow executable configurable to execute predefined software development process policies in response to software check-in events. At block 226, the method 220 comprises, in response to receiving the user input, transmitting the identification of the application development framework tool by the project microservice to a templates microservice.

At block 228, the method 220 comprises, in response to receiving the identification of the application development framework tool, selecting by the template microservice executing on the computer system an application development tool based on the identification of the application development framework tool. At block 230, the method 220 comprises requesting by the template microservice a code builder tool associated with the selected application development framework tool to build a software repository. At block 232, the method 230 comprises returning software repository artifacts built by the code builder tool by the template microservice to the project microservice. In an embodiment, the template microservice builds some of the software repository artifacts that it returns to the project microservice. At block 234, the method 230 comprises installing the software repository artifacts by the project microservice in the software repository. In an embodiment, installing the software repository artifacts by the project microservice in the software repository configures the software repository to execute predefined software development process policies. In an embodiment, installing the software repository artifacts by the project microservice in the software repository configures a continuous integration/continuous delivery (CI/CD) pipeline to be executed by the software repository in response to software check-in events. At block 236, the method 220 comprises presenting a sandbox learning interface to the user inputting information. In an embodiment, the method 220 further comprises, in response to the user input selecting a geographic redundancy configuration, building geographic redundancy into the software development project infrastructure by the project microservice.

Figure 4:
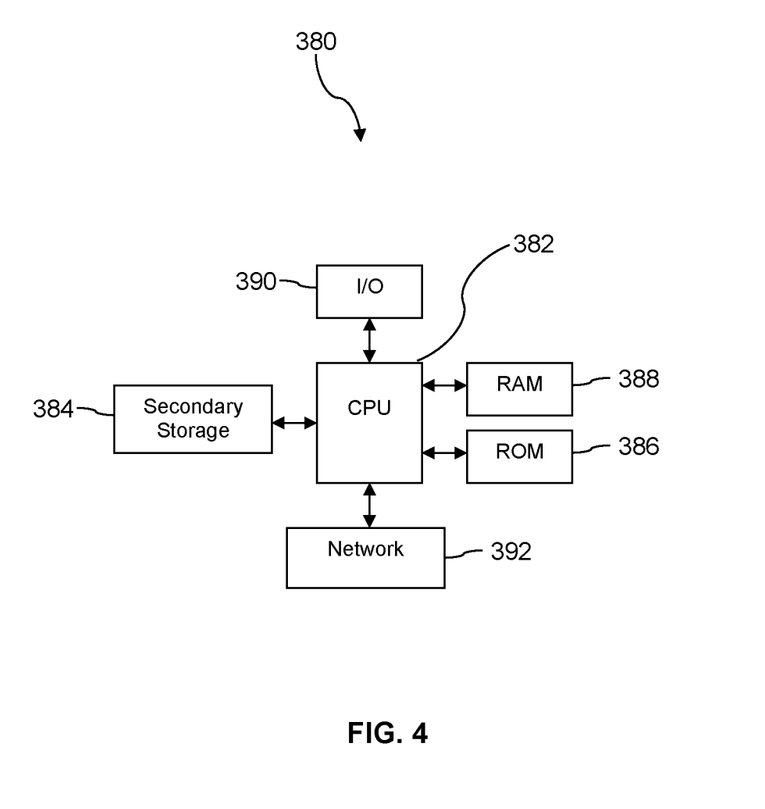
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of building a software development project infrastructure based on receiving declaratory statements from a user, comprising:
    receiving by a project microservice executing on a computer system, user input comprising identification of an application development framework tool and a software development project name;
    in response to receiving the user input, creating a software repository in a software repository and workflow tool system by the project microservice, wherein the software repository comprises a workflow executable configurable to execute predefined software development process policies in response to software check-in events;
    in response to receiving the user input, transmitting the identification of the application development framework tool by the project microservice to a templates microservice;
    in response to receiving the identification of the application development framework tool, selecting by the templates microservice executing on the computer system, an application development tool based on the identification of the application development framework tool;
    requesting by the templates microservice a code builder tool associated with the application development framework tool to build software repository artifacts;
    returning the software repository artifacts built by the code builder tool by the templates microservice to the project microservice;
    installing the software repository artifacts by the project microservice in the software repository; and
    presenting a sandbox learning interface to the user inputting information.

2. The method of claim 1, wherein installing the software repository artifacts by the project microservice in the software repository configures the software repository to execute predefined software development process policies.

3. The method of claim 2, wherein the templates microservice builds at least one of the software repository artifacts that it returns to the project microservice.

4. The method of claim 2, wherein installing the software repository artifacts by the project microservice in the software repository configures a continuous integration/continuous delivery (CI/CD) pipeline to be executed by the software repository in response to software check-in events.

5. The method of claim 1, wherein the user input further defines whether a geographic redundancy configuration is needed for the software development project infrastructure.

6. The method of claim 5, further comprising, in response to the user input selecting a geographic redundancy configuration, building geographic redundancy into the software development project infrastructure by the project microservice.

7. A method of building a software development project infrastructure based on receiving declaratory statements from a user about a kind of environment desired, streamlining a process of getting a software development project underway and prompting consistent compliance with software development process policies, comprising:
    receiving by a project microservice executing on a computer system, user input comprising identification of an application development framework tool, identification of a location to deploy a software development project environment, and a software development project name;
    in response to receiving the user input, creating a software repository in a software repository and workflow tool system by the project microservice, wherein the software repository comprises a workflow executable configurable to execute predefined software development process policies in response to software check-in events;
    in response to receiving the user input, transmitting the identification of the application development framework tool by the project microservice to a templates microservice;
    in response to receiving the identification of the application development framework tool, selecting by the templates microservice executing on the computer system, an application development tool based on the identification of the application development framework tool;
    requesting by the templates microservice a code builder tool associated with the application development framework tool to build software repository artifacts;
    returning the software repository artifacts built by the code builder tool by the templates microservice to the project microservice, wherein the artifacts comprise code stubs that each comprises application programming interfaces (APIs), links to authentication libraries, and links to logging libraries;

installing the software repository artifacts by the project microservice in the software repository; and deploying the software development project infrastructure by the project microservice at the location identified by the user input.

8. The method of claim 7, wherein the code builder tool associated with the application development framework tool is located outside the templates microservice and outside the project microservice.

9. The method of claim 7, wherein the identification of the application development framework tool comprises a uniform resource locator (URL), a uniform resource identifier, or an Internet Protocol (IP) address that references the code builder tool associated with the application development framework tool.

10. The method of claim 7, wherein the software repository artifacts comprise a script that executes when software is checked into the software repository that screens the checked in software for compliance with predefined coding standards.

11. The method of claim 7, wherein the software repository artifacts comprise a plurality of code scaffolding files.

12. The method of claim 11, wherein the code scaffolding files comprise logging functionality.

13. The method of claim 7, wherein the software development project infrastructure comprises a set of computing resources and software development tools used to design, develop, test, and release software.

14. A software development project infrastructure builder tool that builds a software development project infrastructure based on receiving declaratory statements from a user about a kind of infrastructure desired, streamlining a process of getting a software development project underway and prompting consistent compliance with software development process policies, comprising:

a processor;

a non-transitory memory;

a user interface stored in the non-transitory memory that, when executed by the processor, presents a list of available application development framework tools and receives input selecting an application development framework tool of the available application development framework tools and a software development project name;

a templates microservice stored in the non-transitory memory that, when executed by the processor, receives a command to build software artifacts that identify characteristics of a software repository, selects a code builder tool based on the characteristics of the software repository, requests automatically generated software artifacts from the selected code builder tool, and returns the software artifacts; and a project microservice stored in the non-transitory memory that, when executed by the processor, receives information about the application development framework tool and the software development project name, creates an empty software repository based on the software development project name in a software repository and workflow tool system, requests corresponding software artifacts from the templates microservice, receives the corresponding software artifacts from the templates microservice, installs the corresponding software artifacts into the empty software repository in the software repository and workflow tool system.

15. The software development project infrastructure builder tool of claim 14, wherein the list of available application development framework tools includes a SPRING BOOT application development framework tool, an ANGULAR application development framework tool, and a REACT application development framework tool.

16. The software development project infrastructure builder tool of claim 14, wherein the characteristics of the software repository identify the application development framework tool.

17. The software development project infrastructure builder tool of claim 16, wherein the code builder tool and other non-selected code builder tools associated with the list of available application development framework tools are implemented outside of the software development project infrastructure builder tool.

18. The software development project infrastructure builder tool of claim 14, wherein the software artifacts returned by the templates microservice to the project microservice comprises software artifacts implementing a continuous integration-continuous delivery (CI/CD) pipeline that are generated by the templates microservice based on the characteristics of the software repository.

19. The software development project infrastructure builder tool of claim 18, wherein executing the CI/CD pipeline in the software repository and workflow tool system causes a software project infrastructure to be established outside of the software development project infrastructure builder tool.

20. The software development project infrastructure builder tool of claim 14, wherein the software repository and workflow tool system is implemented outside of the software development project infrastructure builder tool.

\* \* \* \* \*